(No Model.) 2 Sheets—Sheet 1.
A. V. M. SPRAGUE.
THERAPEUTICAL APPARATUS.
No. 601,684. Patented Apr. 5, 1898.
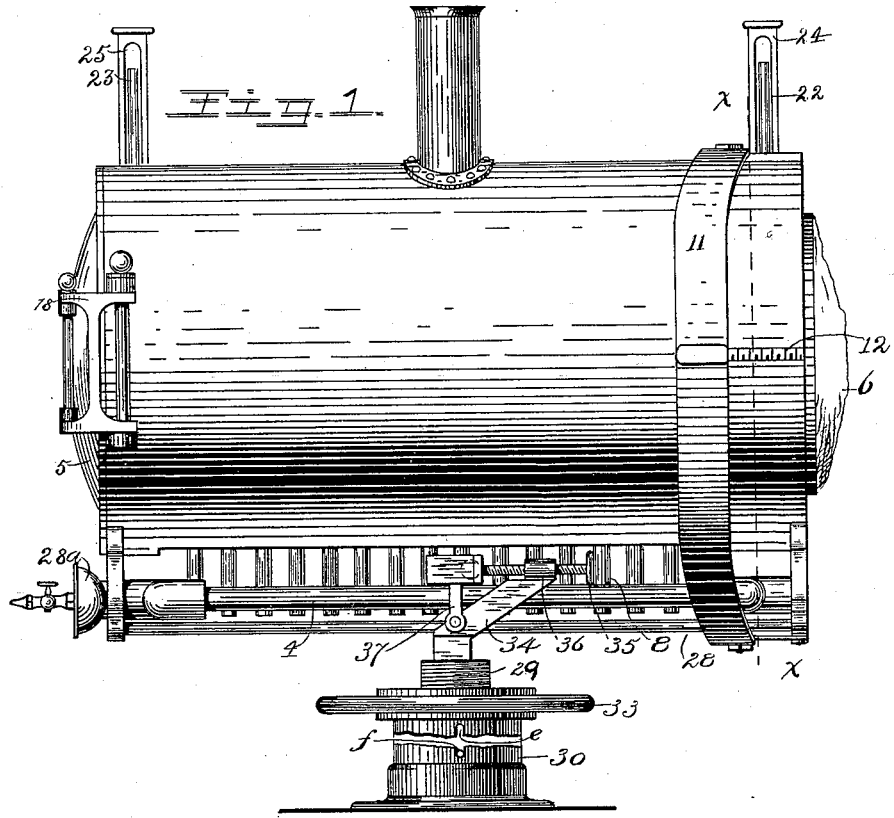
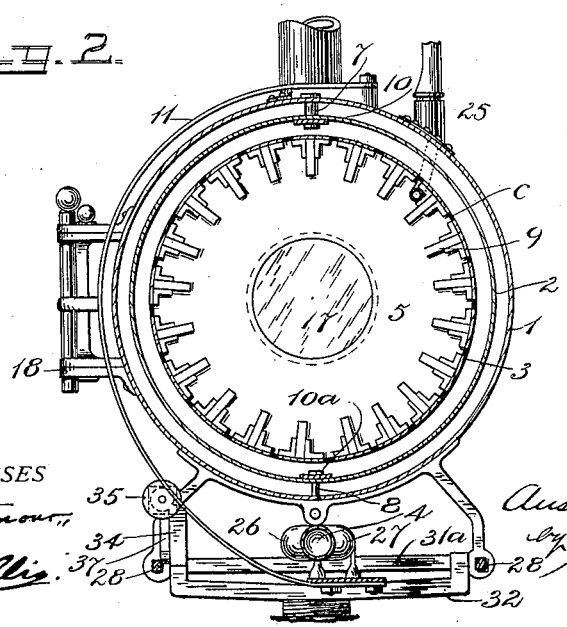
WITNESSES
INVENTOR
Austin V. M. Sprague
by John M. Seward
Attorney (No Model.)  2 Sheets—Sheet 2.
A. V. M. SPRAGUE.
THERAPEUTICAL APPARATUS.
No. 601,684. Patented Apr. 5, 1898.
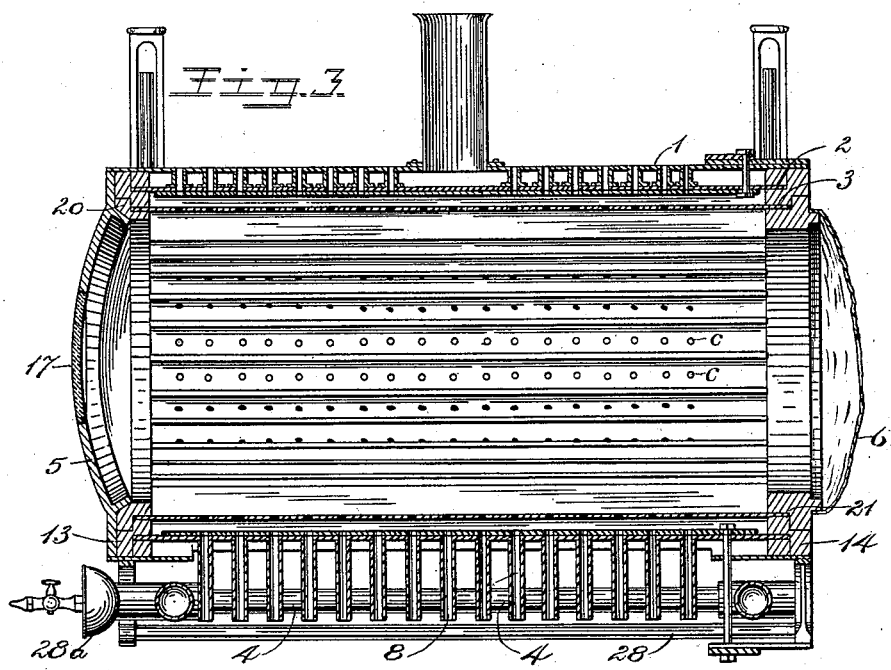
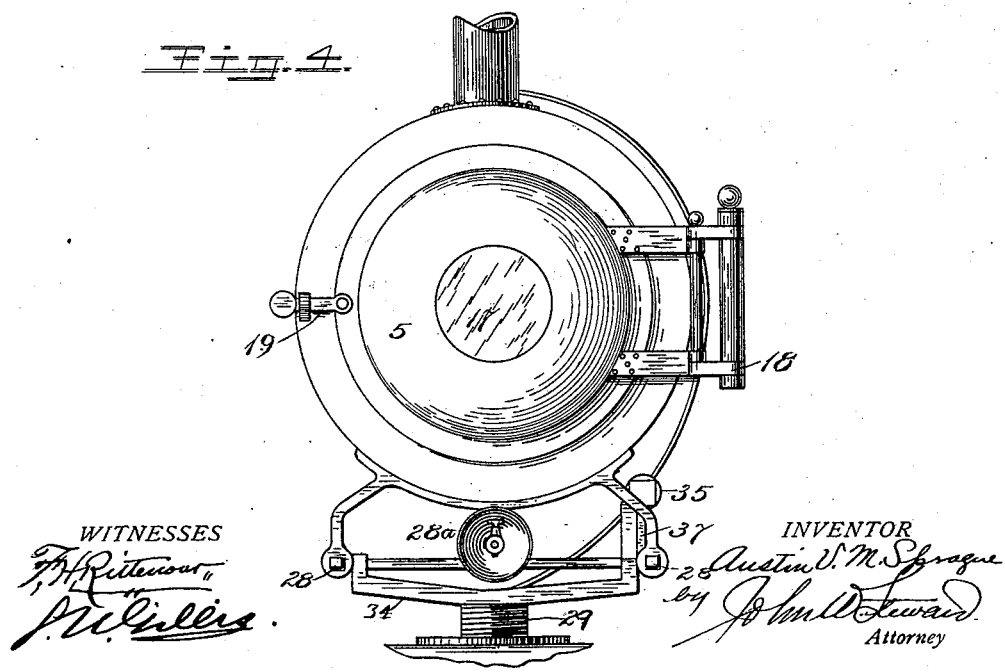
WITNESSES
INVENTOR
Austin V. M. Sprague
by John M. Steward
Attorney

UNITED STATES PATENT OFFICE.

AUSTIN V. M. SPRAGUE, OF BROOKLYN, NEW YORK.

THERAPEUTICAL APPARATUS.

SPECIFICATION forming part of Letters Patent No. 601,684, dated April 5, 1898.

Original application filed February 18, 1897, Serial No. 623,935. Divided and this application filed December 6, 1897. Serial No. 660,841. (No model.)

*To all whom it may concern:*

Be it known that I, AUSTIN V. M. SPRAGUE, a citizen of the United States, residing at Brooklyn, in the county of Kings and State of New York, have invented a certain new and useful Improvement in Therapeutical Apparatus, of which the following is a specification.

My invention is a therapeutical apparatus in which heat is employed as the remedial agent.

Heretofore others have produced apparatus which are adapted to receive or to be applied to a part or parts of the human body and in or by which said part or parts are to be brought into contact with a body of hot air. The idea of treatment by hot air is therefore not original with me. In fact, hot air has been used from time immemorial as a heat vehicle from which heat units are taken in order to alleviate pains and aches arising from a variety of diseases. Before the date of my invention, however, the remedial effects of very high temperatures were not appreciated, nor was it known how such temperatures might be utilized without at the same time working great injury to the part under treatment. In fact, it was generally understood that a heating agent having a temperature higher than the boiling-point of water would destroy the tissues of the member undergoing treatment; but the reasons for this destruction of tissues, it would appear, have not heretofore been thoroughly analyzed or elucidated. Upon careful investigation of this subject I discovered that the perspiration from the pores of the skin will when subjected to the action of heat at high temperatures first turn into vapor and then into steam, which coming into contact with the skin produces the injurious results to which I have referred. Having thus discovered the barrier which lay between success and failure in the use of this type of therapeutical apparatus when operated at a very high temperature, I endeavored to surmount it by the production of an apparatus that would embody means for removing the vapors as rapidly as they are generated, or before they can be heated to the steam-point, or for removing steam as soon as it is formed.

My invention, as will appear from the foregoing statement and from the claims which form a part of this specification, contains two principal or essential features: first, means for maintaining the temperature within the operating-chamber of the apparatus at a point above the boiling-point of water, and, second, means for removing substantially all vapors or steam from the apparatus, thus rendering it possible to maintain the temperature above the boiling-point of water.

The means which I employ for removing the moisture which is continually exuding to some extent from the pores of the skin of the part undergoing treatment consists of devices for producing ventilative streams of air or other suitable agent comprising bodies that are constantly and successively entering the apparatus in a dry state and as constantly and successively passing out therefrom in a moisture-laden condition. The abundance of air probably renders it preferable to any other agent for use in this connection.

In the form of apparatus which I have shown in the accompanying drawings and am about to describe the heat vehicle receives heat both before and after entering the apparatus; but since the all-essential feature of a successful treatment is the maintaining of the high temperature to which I have referred it is quite immaterial at what point or points the heat vehicle takes the heat units with which it is supplied. Moreover, in the form of apparatus aforesaid the products of combustion from the burners do not flow to the operating-chamber of the apparatus and do not therefore commingle with the air that is within said chamber. This form of apparatus is to be preferred to one in which the products of combustion enter the operating-chamber, because said products contain aqueous vapors, the presence of which ought to be avoided as far as possible. However, if the chamber is sufficiently ventilated—that is to say, if there is adequate provision for removing the vapors of perspiration that accumulate during the treatment of a patient—it would be possible to permit the whole or a part of the products to flow into said chamber, although great care would then have to be exercised by the attendant in order to prevent scalding.

My apparatus is particularly adapted to the treatment of such diseases as rheumatism, gout, sprains, and other kindred ailments, and probably has other fields of usefulness, although its capabilities have not as yet been fully tested. Its utility in the treatment of rheumatism, gout, and sprains, however, has been satisfactorily demonstrated. The exact manner in which cures are effected is not known, but it is supposed that the flow of blood to and from the diseased parts is greatly stimulated by the heat and that calcareous and other deposits are carried away in the circulation. Since the temperature of the blood is materially raised during the period of treatment, it is possible that the blood is sterilized or rendered barren of the diseased germs with which it is laden, the potency of a healthy circulation in overcoming any forms of disease being well understood.

In another and concurrently-pending application, Serial No. 623,935, filed February 18, 1897, of which this application is a division, I have described and claimed the method which is performed by the apparatus to which I have referred. I therefore make no claim to the method in this application.

The apparatus above referred to is fully illustrated in the accompanying drawings, in which—

Figure 1 is a side elevation of said apparatus. Fig. 2 is a view in cross-section on the line $x$ $x$ of Fig. 1, portions of the apparatus being shown in elevation. Fig. 3 is a longitudinal sectional view of said apparatus, and Fig. 4 is a rear view of said apparatus.

The apparatus consists of three casings 1, 2, and 3, which are concentrically arranged. The outer and intermediate casings form a flue for the passage of a heat vehicle flowing from any convenient source—as, for instance, the products of combustion arising from a gas-burner 4, which is situated just below an opening in the bottom of the outer casing 1. The intermediate casing is the casing for the hot air, and it is provided at one end with a door 5 and at the other end with a flexible covering 6, which may be drawn about the limb of the patient in such a manner as to prevent the escape of the hot air at that point. This casing is provided with ventilative tubes 7 8, which are suitably secured thereto and which extend at least as far as the outer wall of the apparatus, so as to receive cool air from the atmosphere below and discharge hot air into the atmosphere above. The upper tubes communicate with openings in the outer casing, while the lower tubes hang pendent between the separated edges of the plate which forms the outer casing.

The inner casing 3 is provided with numerous perforations $c$. This casing is adapted to contain the patient's limb, and it is perforated in order that a perfect ventilation may be insured. The air from the tubes 7 8 will thus enter and pass out of the casing 3 at various points and will carry off the vapor from the evaporation of the perspiration of the patient's limb in its passage through said chamber.

Pads 9, of felt or other soft material which is incapable of conducting heat to any appreciable extent, are arranged longitudinally, circumferentially, or radially within the casing 3 and between its perforations. These pads are shown in the drawings as longitudinally arranged; but I do not wish to be limited to this arrangement.

The admission and emission of air are regulated by slide-dampers 10 $10^a$, which are situated adjacent to the inner ends of the ventilative tubes 7 8, respectively. These slide-dampers are connected with an operating-lever 11, which spans the outer cylinder and is suitably pivoted thereto. A gage 12 is secured to the outer side of said outer casing, so that the lever 11 and the slide-dampers which it operates may be regulated thereby. The slide-dampers being both connected to the same lever are thus made simultaneously adjustable.

The escape of the products of combustion arising from the burner is permitted through a chimney situated in the top of the outer casing.

The respective casings are secured to the annular head-pieces 13 and 14, which carry the door 5 and the flexible covering 6.

The door has a glass panel or bull's-eye 17, which permits the operator to view the interior of the apparatus and visually determine any excess of vapor that is present. Said door is also provided with suitable hinges 18 and a keeper 19, which when the door is shut will insure its closely fitting a ring 20, which is arranged within the head-piece 13.

The flexible covering 6 is secured to a ring 21, which fits within the annular head-piece 14.

Thermometers 22 and 23 extend from the interior of the casing 3 to the outside of the apparatus, where they are suitably protected by casings 24 and 25. A portion of each thermometer lies parallel to the inner wall of the casing 3, and the free end of the thermometer extends vertically through a passage-way (not shown) in each annular head-piece and the rings carried thereby, said thermometer being supported as well as protected by the pads which project from the wall of the casing on either side of the same.

Situated just below the opening in the outer casing is the above-mentioned burner 4, having two parallel tubes 26 and 27, which are perforated and extend substantially the length of the apparatus. These tubes receive an adequate supply of commingled air and gas from an ordinary Bunsen-burner mixing device $23^a$, which communicates with them.

The entire apparatus is supported upon a frame 28, secured to the outer casing. This frame is supported by a base 30, having a vertical tubular portion within which an externally-threaded pedestal 29 is adapted to reciprocate. The pedestal carries the arms 31 and 32, upon which the frame for the apparatus is pivotally mounted, and said pedestal is operated by an internally-threaded hand-wheel 33, which rests upon the top of the tubular portion of the base. A slot e in the tubular portion receives a projection f on the pedestal, so as to limit the movement of the latter up or down.

An extension 34, integrally connected to the arm 31, carries a hand-screw 35, which operates in the internally-threaded bushing 36 on the extension.

A lever 37 is rigidly connected to the axis 31$^a$ of the frame 28, and the hand-screw 35 is connected to the lever by a ball-and-socket joint.

The combination of elements last described comprises a device by which the apparatus may be oscillated and thus rendered capable of being tilted to various inclinations.

In the use of this apparatus the casings are adjusted to the proper height and inclination and the limb of the patient is inserted, the door being closed and the flexible covering drawn closely about the limb. When the burner or other heating apparatus is put into operation, if the heat arising therefrom is sufficient, the limb of the patient will begin to perspire to some extent. This perspiration becoming heated and vaporized must be carried off before or soon after it assumes the gaseous state in order not to scald the limb, as above stated. The slide-dampers controlling the admission and emission of the air to and from the apparatus are therefore manipulated by means of their lever, and by observations at the bull's-eye they are regulated accordingly.

It is of course possible that the temperature may become greater than is desirable in any given case, though the air within the casing is kept perfectly dry. For this reason the thermometers may be frequently consulted and the supply of heat governed accordingly by regulating the flow of gas to the burner. This will seldom be found necessary, however, because the temperature within the apparatus may rise to 300° or over without injury, provided the operator carefully regulates the flow of fresh air to and from the apparatus.

Having thus fully described my invention, what I claim, and desire to secure by Letters Patent of the United States, is—

1. In a therapeutical apparatus, the combination of a chamber adapted to receive or to be applied to a part of the human body, means for maintaining the temperature within said chamber above the boiling-point of water and means for admitting such a current of dry air to said chamber as will remove the vapors arising from the part of the body being treated as rapidly as they are generated, substantially as described.

2. In a therapeutical apparatus, the combination of an air-chamber adapted to receive the limb of a patient, means for continually heating, and maintaining the temperature of, the air within said chamber above the boiling-point of water, and means for admitting such volume of air to said chamber as to continually effect the displacement of the accumulating vapor, substantially as described.

3. In a therapeutical apparatus, the combination of an air-chamber adapted to receive the limb of a patient, means for heating the air within said chamber, and means for continually admitting a current of substantially dry air to, and thereby expelling moist air from, said chamber, substantially as described.

4. In a therapeutical apparatus, the combination of an air-chamber adapted to receive the limb of a patient, means for heating the air within said chamber, means for continually admitting a current of substantially dry air to, and thereby expelling moist air from, said chamber, and means for regulating the temperature in said chamber, substantially as described.

5. In a therapeutical apparatus, the combination of an air-chamber adapted to receive the limb of a patient, means for heating the air within said chamber, a series of tubes for continually admitting a current of substantially dry air to said chamber to expel moist air therefrom and another series of tubes for continually discharging said moist air from said chamber, dampers for each of said series of tubes, and means for operating said dampers, substantially as described.

6. In a therapeutical apparatus, the combination of an air-chamber adapted to receive the limb of a patient, means for heating the air within said chamber, a series of tubes for continually admitting a current of substantially dry air to said chamber to expel moist air therefrom and another series of tubes for continually discharging said moist air from said chamber, dampers for each of said series of tubes, and a lever for simultaneously operating said dampers, substantially as described.

7. In a therapeutical apparatus, an air-chamber adapted to receive the limb of a patient and provided with ventilative openings, a flue surrounding said air-chamber, and a source of heat communicating therewith and situated below said air-chamber and in contiguity to said openings so as to induce a current of substantially dry air to said chamber, substantially as described.

8. In a therapeutical apparatus, an air-chamber provided with ventilative openings, a perforated casing arranged within said chamber and adapted to receive the limb of a patient, a flue surrounding said air-chamber, and a source of heat communicating therewith and situated below said chamber and in contiguity to said openings so as to induce a current of substantially dry air to said chamber, substantially as described.

9. A therapeutical apparatus consisting of the concentrically-arranged inner, intermediate and outer casings, the inner casing being perforated and adapted to receive the limb of a patient and the outer casing being open at the top and bottom, a heating apparatus beneath said bottom opening in the outer casing, a series of tubes communicating with the intermediate casing and projecting through the bottom opening in the outer casing and below the heating apparatus, another series of tubes communicating with the top of said intermediate casing and extending through the outer casing, one of said series of tubes being adapted to admit fresh air to, and the other of said series of tubes being adapted to discharge moist air from, the intermediate casing, slide-dampers for controlling the supply of air through the tubes, and an operating-lever for simultaneously operating the damper of each of said series of tubes, substantially as described.

10. A therapeutical apparatus consisting of the concentrically-arranged inner, outer and intermediate cylinders, the inner cylinder being perforated, adapted to receive the limb of a patient and provided with internally-arranged protective pads, the intermediate cylinder having a series of tubes for admitting fresh air at the bottom thereof, and the outer cylinder having an opening at the top and bottom, means situated beneath said bottom opening in the outer cylinder for heating the air therein and in the intermediate cylinder, slide-dampers for the tubes arranged on the intermediate cylinder, an operating-lever for the dampers fulcrumed on the outer cylinder and adapted to simultaneously adjust said dampers, a gage for the lever, a door adapted to close the cylinders at one end and provided with an observation-port, and a flexible covering secured to the other end of the outer cylinder, substantially as described.

11. In a therapeutical apparatus, the combination of an air-chamber adapted to receive the limb of a patient, a plurality of parallel burners for heating the air within said chamber and situated below the same, and lower or inlet tubes and upper or outlet tubes communicating with said chamber, said lower tubes being arranged between and having their mouths situated slightly below said burners and said burners being adapted to induce ventilative streams of fresh air through the tubes and the chamber, substantially as described.

12. In a therapeutical apparatus, an air-chamber adapted to receive the limb of a patient and provided with means for continually ventilating said chamber, a flue surrounding said chamber, and a heating apparatus situated beneath and communicating with said flue and adapted to induce a heated, continuous and enveloping current of air into contact with said air-chamber, substantially as described.

13. In a therapeutical apparatus, an air-chamber adapted to receive the limb of a patient and provided with upper and lower ventilative openings, a flue surrounding said air-chamber, and a heating apparatus communicating with said flue and situated contiguous to the lower ventilative openings in the air-chamber, and adapted to induce a heated, continuous and enveloping current of air into contact with said chamber and to project streams of fresh air through said ventilative openings in the chamber, substantially as described.

14. In a therapeutical apparatus, the combination with an operating-chamber adapted to receive the limb of a patient and provided with a supporting-frame, of a base therefor, a vertical externally-threaded pedestal telescoped into said base, an adjusting internally-threaded hand-wheel for the pedestal operating thereon and resting on the base, laterally-extending arms carried by said pedestal, an extension projecting forwardly and upwardly from the end of one of said arms, an axis for said chamber rigidly secured to the frame and having bearings in said arms, an upwardly-extending lever secured to the end of said axis adjacent to the extension, and an adjusting hand-screw for tilting said chamber operating in the upper end of the extension and having a ball-and-socket connection with the lever, substantially as described.

In testimony whereof I affix my signature in presence of two witnesses.

A. V. M. SPRAGUE.

Witnesses:
H. C. S. STIMPSON,
SIDNEY C. CHAMBERS.